Dec. 30, 1924.
K. CHRISTIANSEN
INDUCTION REGULATOR SYSTEM
Filed Sept. 2, 1921
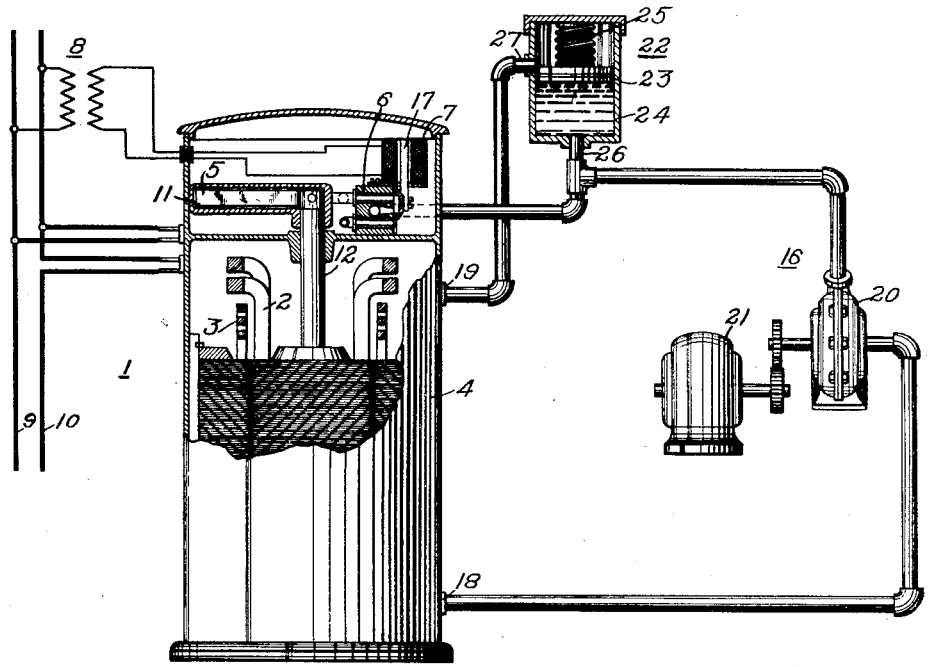
Fig. 1.
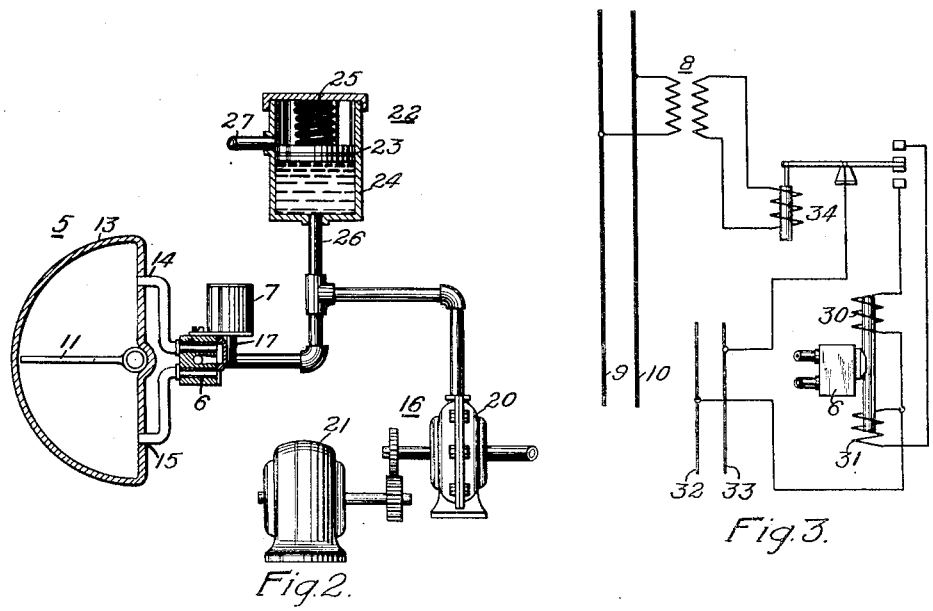
Fig. 2.
Fig. 3.
WITNESSES:
J. A. Helsel.
W. B. Wells
INVENTOR
Kay Christiansen
BY
Wesley G. Carr
ATTORNEY Patented Dec. 30, 1924.

1,521,006

UNITED STATES PATENT OFFICE.

KAY CHRISTIANSEN, OF SAN FRANCISCO, CALIFORNIA, ASSIGNOR TO WESTINGHOUSE ELECTRIC & MANUFACTURING COMPANY, A CORPORATION OF PENNSYLVANIA.

INDUCTION-REGULATOR SYSTEM.

Application filed September 2, 1921. Serial No. 498,099.

*To all whom it may concern:*

Be it known that I, KAY CHRISTIANSEN, a subject of the King of Denmark, and a resident of San Francisco, in the county of San Francisco and State of California, have invented a new and useful Improvement in Induction-Regulator Systems, of which the following is a specification.

My invention relates to regulator systems and particularly to systems for governing the operation of induction regulators.

One object of my invention is to provide an induction regulator that shall be operated directly and quickly in accordance with a change in voltage on the circuit to be regulated and that shall effect any change in position of the rotor winding relative to the stator winding in a continuous movement and not in a step-by-step manner.

In the induction-regulator systems now in service, the motor which operates the regulator is located adjacent to the regulator casing and is connected to the regulator shaft by a system of gearing. The motor, which may be of the fluid-pressure type, is controlled by a magnet-operated valve, and the magnet of such valve structure is controlled by a relay in accordance with the voltage obtaining on the circuit to be regulated.

In an induction-regulator system constructed in accordance with my invention, the motor, which operates the regulator, is mounted within the regulator casing and the moving parts of the motor are mounted directly upon the moving parts of the regulator. Thus, the system is simplified by eliminating the gearing system between the motor and the movable coil of the regulator, and the structure is rendered more compact by mounting a motor within the casing. Moreover, the fluid motor which operates the movable coil of the regulator is controlled by a magnet-operated valve directly in accordance with the voltage obtaining upon the circuit to be regulated.

In the accompanying drawing, Figure 1 is a diagrammatic view of an induction-regulator system constructed in accordance with my invention;

Fig. 2 is a diagrammatic view of a portion of the system shown in Fig. 1, and

Fig. 3 is a diagrammatic view of a modification of my invention.

Referring to the drawing, an induction regulator 1, comprising a rotor winding 2 and a stator winding 3, is mounted within a casing 4 of any suitable type. A fluid motor 5 is preferably mounted above the windings 2 and 3 and within the regular casing 4. A valve 6, of any suitable type, is provided for controlling the operation of the motor 5 and a magnet 7, of any suitable type, is provided for operating the valve 6. The coil of the magnet 7 is connected by a transformer 8 to a supply circuit comprising conductors 9 and 10. The windings 2 and 3 of the induction regulator are connected to the supply conductors 9 and 10 in the usual manner.

The motor 5 comprises a blade or arm 11 which is mounted directly upon the shaft 12 of the regulator and which effects a movement of rotation within a semi-cylindrical casing 13. The casing 13 is provided with two ports 14 and 15 which are disposed on opposite sides of the blade 11 and which are connected to the valve 6.

The valve 6 may be of any suitable type and, preferably, is a balanced valve, in order to relieve the magnet 7 of any unnecessary work. In the drawing, the valve has been illustrated, for convenience, as an ordinary slide valve. The valve 6 serves to connect either the port 14 or the port 15 to a fluid pressure system 16. If the port 14 is connected to the fluid pressure system, the blade 11 and the rotor winding 2 are moved in a counter-clockwise direction; whereas, if the port 15 is connected to the fluid pressure system, the blade 11 and the rotor winding 2 are moved in a clockwise direction. The core armature 17 of the magnet 7 is directly connected to the moving part of the valve 6 in any suitable manner in order to control the operation of the motor 5 directly in accordance with the voltage obtaining upon the supply conductors 9 and 10.

The regulator casing is filled with any suitable insulating fluid and two openings 18 and 19 are provided in the regulator casing in order to permit the circulation of such insulating fluid. The pressure system 16, which is connected to the two openings 18 and 19 and also to the valve 6, comprises a pump 20, of any suitable type, which is operated by a motor 21. The pump 20 is directly connected, on one side, to the opening 18 in the regulator casing, and, on the other side, to the valve 6 and to a pressure regulator 22.

The pressure regulator 22 comprises a piston 23 which operates within a cylinder 24 and which is biased in a downward direction by means of a spring member 25. The fluid pressure which is maintained within the system may be controlled by varying the strength of the spring member 25. The cylinder 24 is provided with an inlet port 26 which is directly connected to the pump 20 and an outlet port 27 which is directly connected to the opening 19 in the regulator casing 4. When a predetermined pressure is supplied to the pressure regulator 22, the piston 23 is raised above the outlet port 27 and a circulation of insulating fluid is effected through the pressure system.

If the voltage on the supply conductors 9 and 10 is raised above normal value, the excitation of the magnet 7 is increased to raise the core armature 17. Such movement of the core armature operates the valve 6 to admit fluid pressure through the port 14 to the fluid motor 5. Thereupon, the blade 11 of the fluid motor operates the rotor winding 2 in a counter-clockwise direction to lower the voltage obtaining upon the supply conductors 9 and 10.

If the voltage obtaining on the supply conductors falls below normal value, the energization of the magnet 7 is decreased to lower the core armature 17. Such movement of the core armature operates the valve 6 to connect the port 15 of the fluid motor to the fluid pressure system. Thereupon, the rotor winding 2 is operated in a clockwise direction to increase the voltage on the supply conductors.

Referring to the modification shown in Fig. 3 of the drawing, the valve 6 is controlled by two magnets 30 and 31 in place of the single magnet 7, as shown in Figs. 1 and 2. The magnets 30 and 31 are selectively connected across any suitable auxiliary supply circuit, comprising conductors 32 and 33, by means of a relay 34. The relay 34 is connected to the supply conductors 9 and 10 by means of the transformer 8.

The operation of the system shown in Fig. 3 is similar to the operation of the system shown in Figs. 1 and 2. In case a voltage above normal value obtains upon the supply conductors 9 and 10, the relay 34 is operated to connect the winding of the magnet 30 across the supply conductors 32 and 33. The magnet 30 thereupon operates the valve 6 to effect counter-clockwise rotation of the blade 11 and the rotor winding 2. Such movement of the rotor winding 2, as before set forth, effects a reduction in the voltage obtaining upon the supply conductors 9 and 10.

If the voltage obtaining upon the supply conductors 9 and 10 is below normal value the relay 34 connects the magnet 31 across the auxiliary supply conductors 32 and 33. The magnet 31 operates the valve 6 to so control the motor 5 as to effect clockwise rotation of the rotor winding 2. Such movement of the rotor winding effects an increase in the voltage obtaining upon the supply conductors 9 and 10.

Modifications in the system and in the arrangement and location of parts may be made within the spirit and scope of my invention and such modifications are intended to be covered by the appended claims.

I claim as my invention:—

1. The combination comprising an induction regulator having a movable winding, and a motor for operating said regulator and having a propelling blade mounted on the shaft of said movable winding.

2. The combination comprising an induction regulator having a movable winding, a motor for operating said regulator comprising a semi-cylindrical casing, a propelling blade mounted on said movable coil and adapted to effect a movement of rotation in said casing, and means for supplying fluid pressure to said casing on either side of said blade.

3. The combination comprising a supply circuit, an induction regulator connected to said supply circuit, a motor having a rotatable enclosed blade mounted on the shaft of the regulator, a valve for supplying fluid pressure to either side of said blade, and a magnet connected to said supply circuit for directly operating said valve.

4. The combination comprising an induction regulator, a fluid-operated motor for operating the regulator and having the movable portion thereof directly mounted on the shaft of the regulator, a valve for controlling the motor, and a magnet energized by the circuit to be regulated for directly operating said valve.

5. The combination comprising an induction regulator, a fluid-pressure motor having the moving portion thereof directly mounted on the shaft of the regulator, and a magnet and a valve for controlling the operation of the motor in accordance with the voltage obtaining on the circuit to be regulated.

6. The combination comprising an induction regulator having a stationary and a movable winding, a casing surrounding such windings, a fluid pressure motor having the moving portion thereof directly mounted on the shaft of the regulator, a valve mounted in said casing and controlling the operation of the motor, and a magnet energized in accordance with the voltage on the circuit to be regulated and directly connected to said valve.

In testimony whereof, I have hereunto subscribed my name this 23rd day of August, 1921.

KAY CHRISTIANSEN.